April 21, 1931.  L. A. THATCHER  1,801,396
TYPEWRITING MACHINE
Filed Sept. 24, 1926
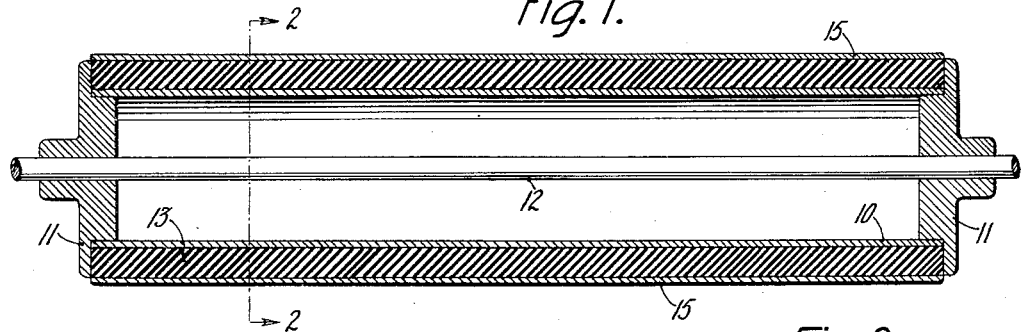
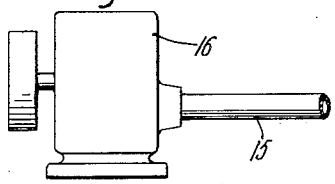
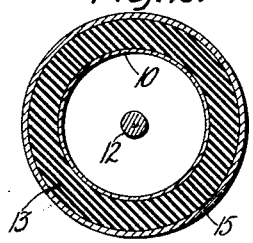
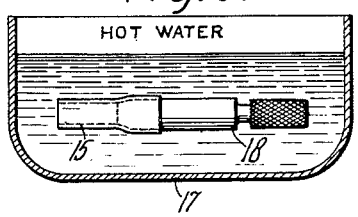
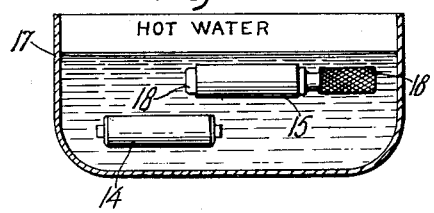
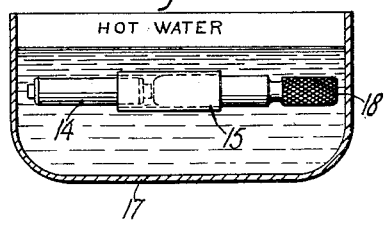
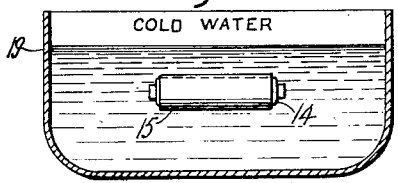
Inventor:
Linden A Thatcher
by B C Stickney
Attorney.

Patented Apr. 21, 1931

1,801,396

UNITED STATES PATENT OFFICE

LINDEN A. THATCHER, OF BELLEVILLE, NEW JERSEY, ASSIGNOR TO UNDERWOOD ELLIOTT FISHER COMPANY, OF NEW YORK, N. Y., A CORPORATION OF DELAWARE

TYPEWRITING MACHINE

Application filed September 24, 1926. Serial No. 137,406.

This invention relates to cylindrical platens for typewriting machines, and more particularly to means for constructing the same. It depends upon the principle that celluloid contracts much more rapidly than metal or rubber for the same drop in temperature.

The platen includes a metal tube surrounded with a shell of soft rubber. The metal tube is secured to a supporting axle by means of intervening end flanges fast to the axle. A celluloid shell or thin-walled tube is shrunk over said rubber shell which is cylindrical and of uniform diameter, and the whole is then trued by grinding.

The celluloid shell or tube is first produced in the form of spaghetti, and a sufficient length is cut off for a platen. At that time the celluloid is cold. Then the cut-off length is immersed in hot water, thereby softening it and making it pliable and tenacious. It is then stretched or expanded over a steel mandrel which is oversize. The original celluloid tube is smaller than the outside diameter of the platen-core, but when heated it is stretched over the mandrel until it becomes larger. The celluloid shell is kept on the mandrel in hot water. Then the platen is immersed in hot water, and the celluloid tube is pulled off from the mandrel and is slipped onto the platen making a loose fit. The assembled platen is subsequently removed from the hot water and immersed in cold water to shrink the celluloid shell tightly and permanently on the platen. This produces a different result that heretofore obtained, as the celluloid in the shrinking process compresses the rubber into a solid mass, and, by reasons of the plastic condition, fills all the small depressions that result therefrom, leaving a comparatively even surface with a uniform density which cannot be obtained in any other way.

Other features and advantages will hereinafter appear.

In the accompanying drawings,

Figure 1 is a longitudinal cross-sectional view of the platen.

Figure 2 is a cross-sectional view of the platen through line 2—2 of Figure 1.

Figure 3 is a diagrammatic view of a machine for making celluloid tubing.

Figure 4 shows the celluloid casing.

Figure 5 shows the celluloid casing being expanded by means of an oversize mandrel.

Figure 6 shows the expanded casing and the core ready for receiving the casing.

Figure 7 shows the casing being slipped off the mandrel and over the core.

Figure 8 shows the casing being shrunk over the core in a cold water container.

The platen is built up upon a metal tube or inner core 10, supported, at the ends thereof, by flanges 11. These flanges are secured by means of screws, not shown, to an axle 12. The tube is surrounded with a soft rubber shell 13 about one-quarter of an inch thick. This shell is cemented to the steel tube and is held against endwise displacement by means of the flanges 11. This partly assembled device forms a cylinder or sub-platen of uniform diameter, which serves as the platen-core and is generally indicated by the numeral 14. A shell of celluloid 15 is secured to the core and the assembled platen is then ground to its correct diameter.

The celluloid tube or shell 15 is made in a machine 16 in a continuous length and is cut to the desired length when cold. Other compositions of similar characteristics might also be used for said tube and the term celluloid should be broadly understood herein as representing this class.

The tube is made smaller than the platen-core, that is to say, so that the cold tube may not be pushed over the core. The outside diameter of the core is about one inch and eleven-sixteenths whereas the inside diameter of the tube is about one inch and one-eighth.

Since the tube cannot normally be pushed over the core, which is larger, it is necessary to expand the tube to the size of the core. This is easily accomplished by immersing the tube in a hot water container 17, to soften the tube, and then forcing an expansion mandrel or arbor 18 into the tube as shown in Figure 5. This expanding process produces inner strains within the material of the celluloid tube, which are brought back to normal when the contracting part of the process has been completed, thus bringing the celluloid back to normal condition after the process necessary to put the rubber cushion in proper condition to perform its function is completed. The arbor is made about one inch and one-quarter in diameter, thereby enlarging the tube to this diameter which is one-sixteenth larger than the core. The platen-core is then inserted in the container as shown in Figure 6, and, while the tube is still hot, the same is slipped off the arbor and is pushed over the platen-core as shown in Figure 7. The tube being larger than the core fits loosely thereon. The assembled platen is subsequently withdrawn from the container 17 and is immersed in a cold water container 19 as shown in Figure 8. This is effective to shrink the tube to its original diameter when cold, and to permanently set it. As the original diameter was smaller than the diameter of the core, the tube not only tightly grips the core, but compresses the rubber shell 13, filling at the same time all the little depressions on the surface of the rubber shell, thereby avoiding air-bubbles or small areas of uneven compression, and gives it the necessary liveliness to actively resist the type-blows without undue local yield which would tend to make the impression imperfect or the celluloid noisy.

The original thickness of the celluloid shell may be one thirty-second of an inch, thus leaving a little material that may be finished off, so that the platen may be ground down to the exact diameter required. The celluloid may be stretched to a thickness of about twenty-thousandths of an inch, and is subsequently trimmed or ground down to a thickness of about one sixty-fourth of an inch.

Variations may be resorted to within the scope of the invention, and portions of the improvements may be used without others.

Having thus described my invention, I claim:

1. A platen for a typewriting machine, including a cylindrical core of stiffened resilient material and an outer celluloid shell permanently shrunk and hardened thereon.

2. A platen for a typewriting machine, combining a resiliently-compressible cylindrical core and a celluloid shell shrunk thereon in such manner as to compress the core and retain the same under compressive tension.

3. The method of producing a cylindrical platen for a typewriting machine, which consists in annealing and enlarging a tube of normally hard and heat-plastic material by heating the tube to anneal it, then expanding it to increase its diameter, subsequently sliding the tube, in heated and annealed condition, on a compressible core, and finally shrinking and permanently setting said tube in position on said core so as to compress the same by chilling the tube and re-hardening it.

4. A typewriter-platen including, in combination, a rigid cylindrical tube, a resilient rubber shell mounted upon said tube, a celluloid shell permanently shrunk over said rubber shell, and end flanges for holding said rubber shell under even compression between said tube and celluloid shell and securing the assembled platen upon a platen-axle.

5. The method of producing a platen for a typewriting machine which consists in primarily forming a resiliently-compressible cylindrical core, heating a celluloid tube of relatively smaller diameter than said core to a high annealing temperature, expanding the tube while annealed to a larger diameter, then exposing said cylindrical core to a corresponding high temperature, subsequently sliding said tube over said core while maintaining both the core and the tube at their corresponding high temperatures in order to facilitate said operation and prevent loss of the expanded diameter on the part of said tube, and finally chilling the tube and the core by exposing the same to a relatively low temperature so as to shrink and set said celluloid tube permanently in position upon and compress said core, and thereby complete the assembly of the platen.

LINDEN A. THATCHER.